United States Patent [19]
Lansberry

[11] Patent Number: 5,475,581
[45] Date of Patent: Dec. 12, 1995

[54] WAVEFORM FLAT-TOPPING UNIT

[75] Inventor: Geoffrey B. Lansberry, Cambridge, Mass.

[73] Assignee: Westinghouse Electric Corp., Pittsburgh, Pa.

[21] Appl. No.: 258,295

[22] Filed: Jun. 10, 1994

[51] Int. Cl.⁶ .............................. H02M 1/12; H02P 5/34; H02P 5/28
[52] U.S. Cl. .............................. 363/41; 318/801; 318/811
[58] Field of Search .................................. 363/39, 41, 43, 363/95; 323/313; 318/799, 800, 801, 805, 808, 811

[56] References Cited

U.S. PATENT DOCUMENTS

| | | | |
|---|---|---|---|
| 4,962,339 | 10/1990 | Schauder | 318/798 |
| 5,091,690 | 2/1992 | D'Antonio et al. | 324/107 |
| 5,153,821 | 10/1992 | Blasko | 363/41 |
| 5,168,204 | 12/1992 | Schauder | 318/800 |
| 5,182,508 | 1/1993 | Schauder | 318/801 |
| 5,227,963 | 7/1993 | Schauder | 363/41 |
| 5,272,429 | 12/1993 | Lipo et al. | 318/808 |
| 5,321,599 | 6/1994 | Tanamachi et al. | 363/41 |
| 5,327,335 | 7/1994 | Maddali et al. | 363/39 |
| 5,334,923 | 8/1994 | Lorenz et al. | 318/805 |
| 5,361,196 | 11/1994 | Tanamachi et al. | 363/41 |
| 5,400,237 | 3/1995 | Flanagan et al. | 363/41 |
| 5,414,615 | 5/1995 | Kumar et al. | 363/95 |

*Primary Examiner*—Matthew V. Nguyen

[57] ABSTRACT

A waveform flat-topping unit includes a signal generator for producing first, second and third reference signals and a normalizing unit for normalizing the first reference signal. A waveform generator produces a third harmonic waveform of the normalized first reference signal. A comparator compares a vector value, which is produced according to the first, second and third reference signals, to a predetermined threshold value, the predetermined threshold value being the largest realizable pure signal value. An adder in response to the comparison, adds zero to each of the first, second and third reference signals when the vector value is less than or equal to the predetermined threshold value. The adder adds the third harmonic signal to each of the first, second and third reference signals when the vector value is greater than the predetermined threshold value.

17 Claims, 10 Drawing Sheets 5,475,581

WAVEFORM FLAT-TOPPING UNIT

RELATED APPLICATIONS

The following identified U.S. patent applications are filed on the same date as the instant application and are relied upon and incorporated by reference in this application.

U.S. patent application Ser. No. 08/258,150 entitled "Electric Induction Motor And Related Method Of Cooling" bearing attorney docket No. 58,332, and filed on the same date herewith, pending;

U.S. patent application Ser. No. 08/258,142 entitled "Automotive 12 Volt System For Electric Vehicles" bearing attorney docket No. 58,333, and filed on the same date herewith, pending;

U.S. patent application Ser. No. 08/258,027 entitled "Direct Cooled Switching Module For Electric Vehicle Propulsion System" bearing attorney docket No. 58,334, and filed on the same date herewith, pending;

U.S. patent application Ser. No. 08/258,301 entitled "Electric Vehicle Propulsion System" bearing attorney docket No. 58,335, and filed on the same date herewith, pending;

U.S. patent application Ser. No. 08/258,294 entitled "Speed Control and Bootstrap Technique For High Voltage Motor Control" bearing attorney docket No. 58,336, and filed on the same date herewith, pending;

U.S. patent application Ser. No. 08/258,306 entitled "Vector Control Board For An Electric Vehicle Propulsion System Motor Controller" bearing attorney docket No. 58,337, and filed on the same date herewith, pending;

U.S. patent application entitled Ser. No. 08/258,305 "Digital Pulse Width Modulator With Integrated Test And Control" bearing attorney docket No. 58,338, and filed on the same date herewith, pending;

U.S. patent application Ser. No. 08/258,149 entitled "Control Mechanism For Electric Vehicle" bearing attorney docket No. 58,339, and filed on the same date herewith, pending;

U.S. patent application Ser. No. 08/258,153 entitled "Improved EMI Filter Topology for Power Inverters" bearing attorney docket No. 58,340, and filed on the same date herewith, pending;

U.S. patent application Ser. No. 08/258,179 entitled "Fault Detection Circuit For Sensing Leakage Currents Between Power Source And Chassis" bearing attorney docket No. 58,341, and filed on the same date herewith, pending;

U.S. patent application Ser. No. 08/258,117 entitled "Electric Vehicle Relay Assembly" bearing attorney docket No. 58,342, and filed on the same date herewith, pending;

U.S. patent application Ser. No. 08/258,033 entitled "Three Phase Power Bridge Assembly" bearing attorney docket No. 58,343, and filed on the same date herewith, pending;

U.S. patent application Ser. No. 08/258,034 entitled "Electric Vehicle Propulsion System Power Bridge With Built-In Test" bearing attorney docket No. 58,344, and filed on the same date herewith, pending;

U.S. patent application Ser. No. 08/258,178 entitled "Method For Testing A Power Bridge For An Electric Vehicle Propulsion System" bearing attorney docket No. 58,345, and filed on the same date herewith, pending;

U.S. patent application Ser. No. 08/258,157 entitled "Electric Vehicle Power Distribution Module" bearing attorney docket No. 58,346, and filed on the same date herewith, pending;

U.S. patent application Se. No. 08/258,628 entitled "Electric Vehicle Chassis Controller" bearing attorney docket No. 58,347, and filed on the same date herewith, pending;

U.S. patent application Ser. No. 08/258,156 entitled "Electric Vehicle System Control Unit Housing" bearing attorney docket No. 58,348, and filed on the same date herewith, pending;

U.S. patent application Ser. No. 08/258,299 entitled "Low Cost Fluid Cooled Housing For Electric Vehicle System Control Unit" bearing attorney docket No. 58,349, and filed on the same date herewith, pending;

U.S. patent application Ser. No. 08/258,296 entitled "Electric Vehicle Coolant Pump Assembly" bearing attorney docket No. 58,350, and filed on the same date herewith, pending;

U.S. patent application Ser. No. 08/258,141 entitled "Heat Dissipating Transformer Coil" bearing attorney docket No. 58,351, and filed on the same date herewith, pending;

U.S. patent application Ser. No. 08/258,154 entitled "Electric Vehicle Battery Charger" bearing attorney docket No. 58,352, and filed on the same date herewith, pending.

BACKGROUND OF THE INVENTION

Field of the Invention

The present invention relates generally to flat topping voltage signals. More particularly, the present invention relates to a three-phase flat-topping unit for an electrically powered three phase motor of an electric vehicle. While the invention is subject to a wide range of applications, it is especially suited for use in a pulse width modulator supplying switching signals to operate a three-phase inverter for electric vehicles that utilize batteries or a combination of batteries and other sources, e.g., a heat engine coupled to an alternator, as a source of power, and will be particularly described in that connection.

Discussion of Related Art

For an electric vehicle to be commercially viable, its cost and performance should be competitive with that of its gasoline-powered counterparts. Typically, the vehicle's propulsion system and battery are the main factors which contribute to the vehicle's cost and performance competitiveness.

Generally, to achieve commercial acceptance, an electric vehicle propulsion system should provide the following features: (1) vehicle performance equivalent to typical gasoline-powered propulsion systems; (2) smooth control of vehicle propulsion; (3) regenerative braking; (4) high efficiency; (5) low cost; (6) self-cooling; (7) electromagnetic interference (EMI) containment; (8) fault detection and self-protection; (9) self-test and diagnostics capability; (10) control and status interfaces with external systems; (11) safe operation and maintenance; (12) flexible battery charging capability; and (13) auxiliary 12 volt power from the main battery. In prior practice, however, electric vehicle propulsion system design consisted largely of matching a motor and controller with a set of vehicle performance goals, such that performance was often sacrificed to permit a practical motor and controller design. Further, little attention was given to the foregoing features that enhance commercial acceptance.

For example, a typical conventional electric vehicle propulsion system consisted of a DC motor, a chopper-type motor controller, an independent battery charger, and a distributed set of controls and status indicators. Vehicle performance was generally inadequate for highway driving, acceleration was uneven, and manual gear-changes were required. In addition, regenerative braking was either not available or, at best, available only at high motor speeds. Also, each of the system components had its own cooling system that used forced air or a combination of forced air and liquid cooling. Moreover, the issues of volume production cost, EMI, fault detection, maintenance, control and status interfaces, and safety were generally not addressed in a comprehensive manner.

Three phase inverters are commonly used to supply loads requiring three-phase AC signals from a DC source. In three-phase pluse-width-modulated (PWM) inverters, a voltage reference signal is typically generated for each phase. The voltage reference signal is fed to a pulse width modulator, which may involve a simple comparison with a triangle wave having the carrier frequency. If each phase voltage reference signal is a pure sinewave with peak value just equal to the range limit of the modulator, then the filtered output phase voltages will be sinewaves of amplitude VDC/2, where VDC is the DC-side voltage of the inverter. Under balanced conditions, the corresponding maximum amplitude of the output line-to-line voltage is 0.866 VDC.

If the inverter AC load is a three-wire system, it is possible to introduce additional zero sequence components into the three voltage references without altering the output line-to-line voltages. It is well known that a signal can be generated having triplen (3rd, 9th, etc.) harmonics of the inverter fundamental frequency such that, when the harmonics added to each of the three voltage references, the range of the modulator can effectively be increased for the fundamental frequency. Using this approach, the amplitude of the fundamental output line-to-line voltage can be increased to VDC. This technique is commonly referred to as "flat-topping" because it results in the voltage reference waves taking on a flat-topped appearance. The flat-topping concept is explained in more detail in U.S. Pat. No. 5,227,963 to Schauder.

Also, it is well-known that the only triplen harmonic necessary to perform the desired flat-topping is the 3rd harmonic and the optimum proportion of the 3rd harmonic to be added, resulting in the flattest top, is one sixth (⅙) of the fundamental amplitude. In voltage source inverters, where the output reference voltages are very predictable, generating these third harmonics is relatively simple. In current controlled inverters, however, the reference voltages are unpredictable and it has been very difficult to numerically generate the required zero sequence components.

SUMMARY OF THE INVENTION

Accordingly, the present invention is directed to a flat-topping unit that substantially obviates one or more of the problems due to limitations and disadvantages of the prior art.

An advantage of the present invention is the provision of an arrangement which substantially obviates one or more of the limitations and disadvantages of the described prior art.

Another advantage of the present invention is the provision of a flat-topping unit to increase the fundamental output line-to-line voltages for an electrically powered three phase motor.

Another advantage of the present invention is the provision of producing a flat-topped signal using a flat-topping unit by applying a special trigonometric identity.

The features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof as well as the appended drawings.

To achieve these and other advantages, and in accordance with the purpose of the invention, as embodied and broadly described, a waveform flat-topping unit comprises means for producing first, second and third reference signals; a normalizing unit for normalizing the first reference signal; means for generating a third harmonic waveform of the normalized first reference signal; means for comparing a vector value produced according to the first, second and third reference signals to a predetermined threshold value, the predetermined threshold value being the largest realizable pure signal value; means, responsive to the comparing means, for adding zero to each of the first, second and third reference signals when the vector value is less than or equal to the predetermined threshold value; and means, responsive to the comparing means, for adding the third harmonic signal to each of the first, second and third reference signals when the vector value is greater than the predetermined threshold value.

In another aspect, a waveform flat-topping unit comprises means for producing first, second and third reference signals of a stationary frame; means for producing fourth and fifth reference signals of a rotating frame and corresponding to the first and third reference signals; a normalizing unit for normalizing the first reference signal; means for generating a third harmonic waveform of the normalized first reference signal; means for producing a vector value according to the fourth and fifth reference signals; means for comparing the vector value to a predetermined threshold value, the predetermined threshold value being the largest realizable pure signal value; means, responsive to the comparing means, for adding zero to each of the first, second and third reference signals when the vector value is less than or equal to the predetermined threshold value; and means, responsive to the comparing means, for adding the third harmonic signal to each of the first, second and third reference signals when the vector value is greater than the predetermined threshold value.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention, and together with the description serve to explain the principles of the invention.

DETAILED DESCRIPTION OF THE PREFERRED EMBODIMENTS

Reference will now be made in detail to the present preferred embodiment of the invention, an example of which is illustrated in the accompanying drawings.

Figure 1:
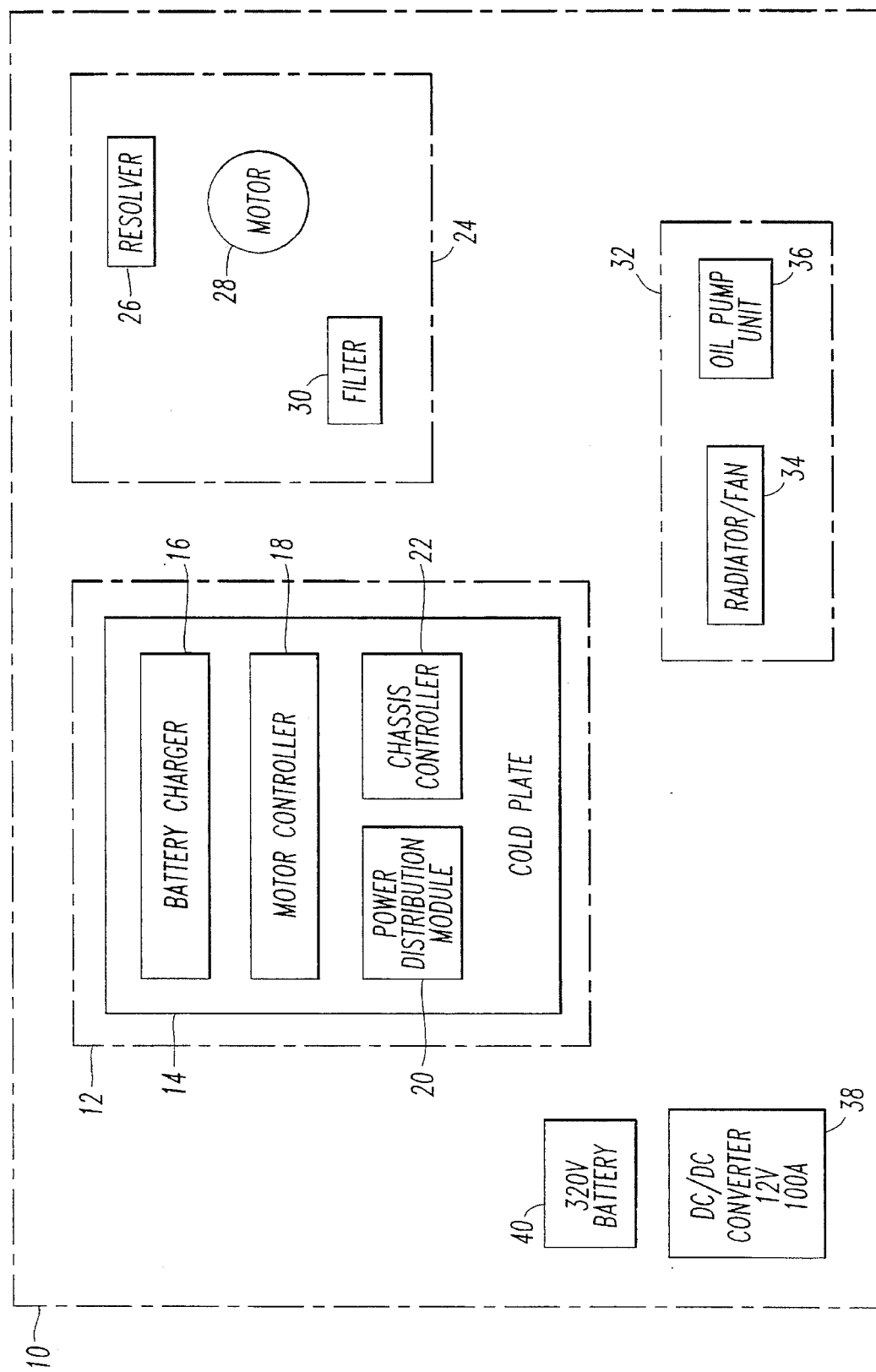
FIG. 1 is a block diagram of an electric vehicle propulsion system in accordance with a preferred embodiment of the invention.

As shown in FIG. 1, there is provided an electric vehicle propulsion system 10 comprising a system control unit 12, a motor assembly 24, a cooling system 32, a battery 40, and a DC/DC converter 38. The system control unit 12 includes a cold plate 14, a battery charger 16, a motor controller 18, a power distribution module 20, and a chassis controller 22. The motor assembly 24 includes a resolver 26, a motor 28, and a filter 30. The cooling system 32 includes an oil pump unit 34 and a radiator/fan 36.

Figure 2:
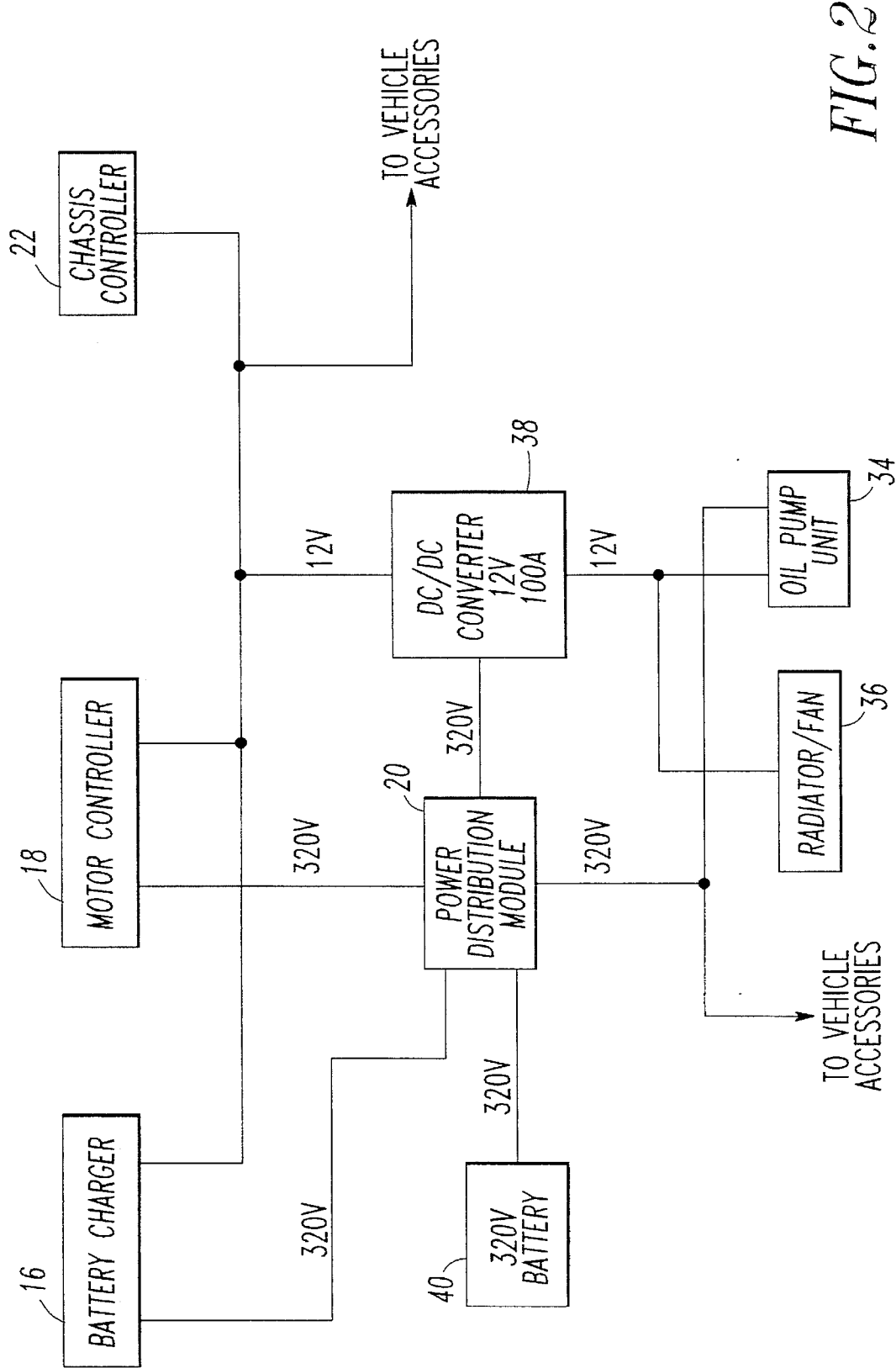
FIG. 2 is a power distribution diagram of the electric vehicle propulsion system of FIG. 1.

As shown in FIG. 2, the battery 40 serves as the primary source of power for the electric propulsion system 10. The battery 40 comprises, for example, a sealed lead acid battery, a monopolar lithium metal sulfide battery, a bipolar lithium metal sulfide battery, or the like, for providing a 320 volt output. Preferably, the electric propulsion system 10 works over a wide voltage range, e.g., 120 volts to 400 volts, to accommodate changes in the output voltage of the battery 40 due to load or depth of discharge. However, the electric vehicle propulsion system 10 is preferably optimized for nominal battery voltages of about 320 volts.

The power distribution module 20 is coupled to the output of the battery 40 and includes, among other things, fuses, wiring, and connectors for distributing the 320 volt output from the battery 40 to various components of the electric vehicle propulsion system 10. For example, the power distribution module 20 distributes the 320 volt output from the battery 40 to the motor controller 18, the DC/DC converter 38, the oil pump unit 34, and the battery charger 16. The power distribution module 20 also distributes the 320 volt output from the battery 40 to various vehicle accessories, which are external to the electric vehicle propulsion system 10. These vehicle accessories include, for example, an air conditioning system, a heating system, a power steering system, and any other accessories that may require a 320 volt power supply.

The DC/DC converter 38, which, as described above, is coupled to the 320 volt output of the power distribution module 20, converts the 320 volt output of the power distribution module 20 to 12 volts. The DC/DC converter 38 then supplies its 12 volt output as operating power to the battery charger 16, the motor controller 18, the chassis controller 22, the oil pump 34, and the radiator/fan 36. The DC/DC converter 38 also supplies its 12 volt output as operating power to various vehicle accessories, which are external to the electric vehicle propulsion system 10. These vehicle accessories include, for example, vehicle lighting, an audio system, and any other accessories that may require a 12 volt power supply. It should be appreciated that the DC/DC converter 38 eliminates the need for a separate 12 volt storage battery.

Figure 5A:
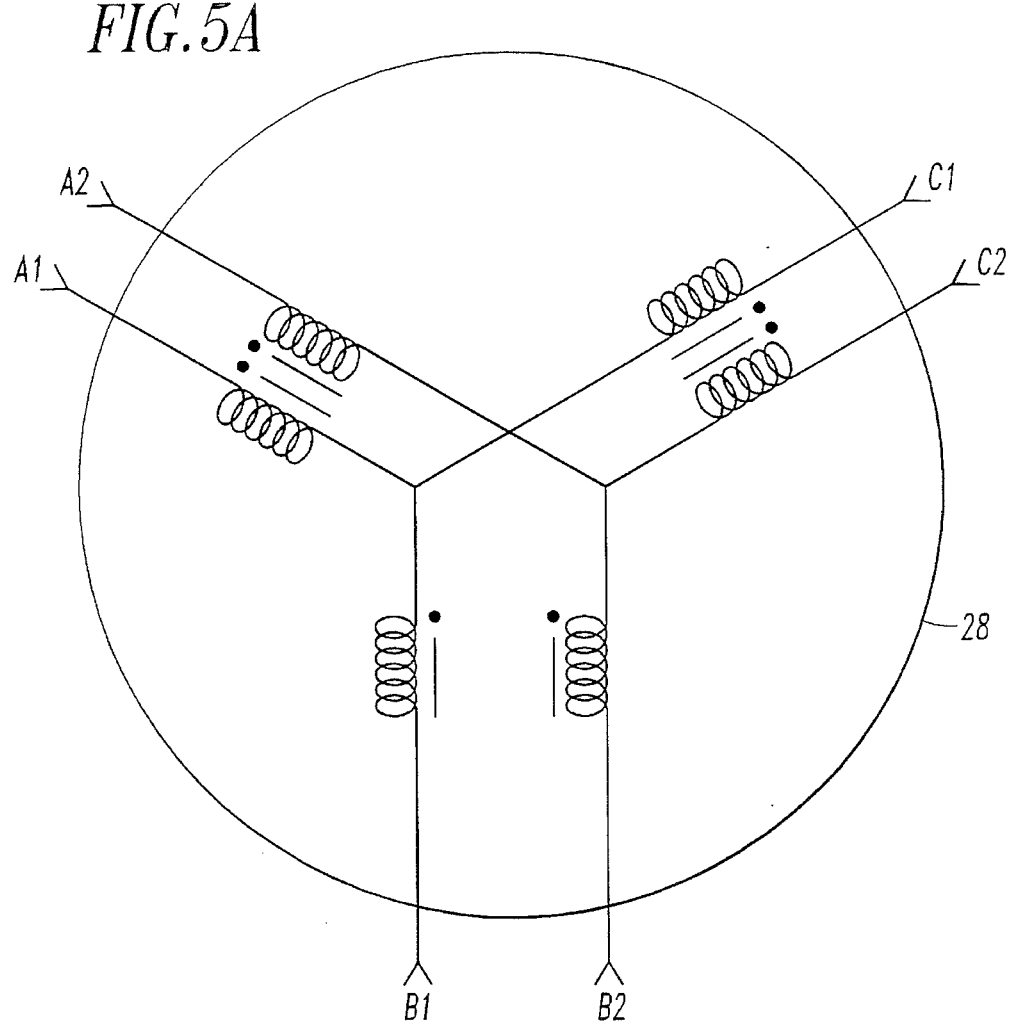
FIG. 5A is a schematic diagram of the motor of the electric vehicle propulsion system of FIG. 1.

As shown in FIG. 5A, the motor 28 is a 3-phase AC induction motor having two identical, electrically isolated, windings per phase (windings A1 and A2 are for the "A" phase, windings B1 and B2 are for the "B" phase, and windings C1 and C2 are for the "C" phase) for producing high torque at zero speed to provide performance comparable to conventional gas-driven engines. The shaft (not shown) of the motor 28 is coupled to the vehicle transaxle (not shown). Preferably, the two windings in each phase of the motor 28 are aligned substantially on top of one another and are electrically in phase such that each winding provides approximately half the total power of the phase. Also the motor 28 is preferably completely sealed and utilizes spray-oil cooling to remove heat directly from the rotor and end windings to increase reliability.

Operation of the electric vehicle propulsion system 10 will now be described with reference to FIGS. 3–5 and 7–10.

Figure 3:
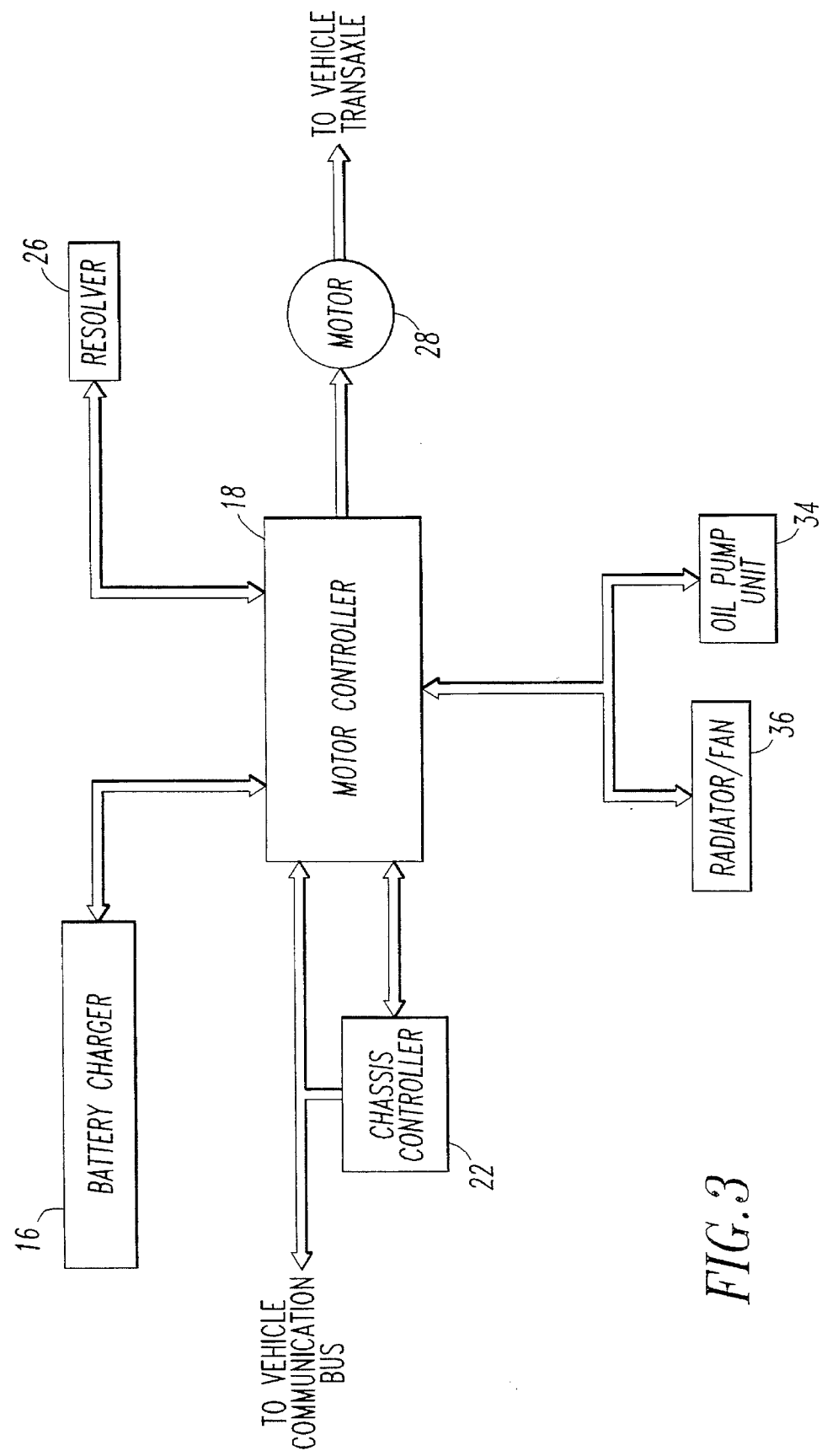
FIG. 3 is a functional diagram of the electric vehicle propulsion system of FIG. 1.
Figure 4:
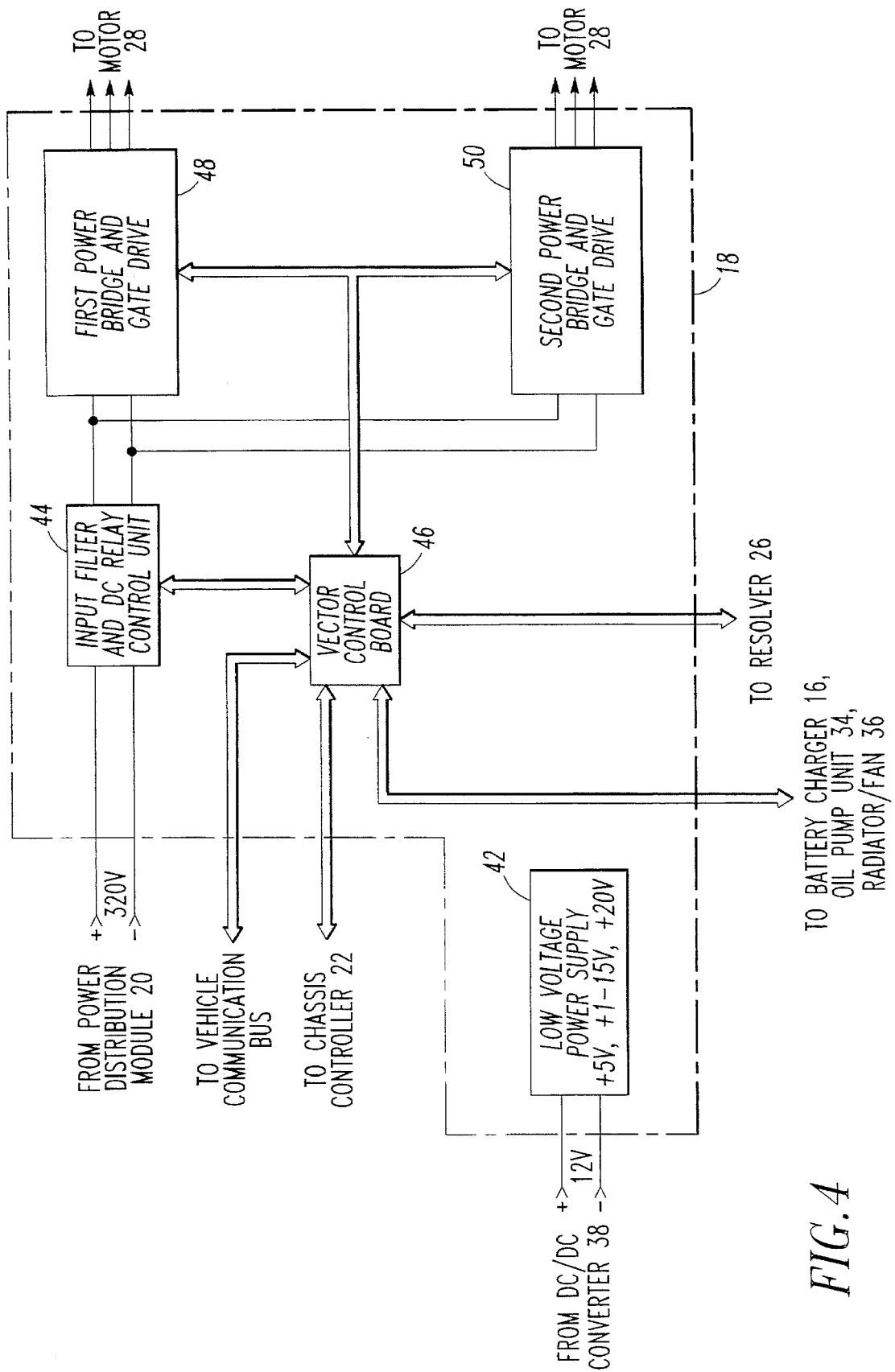
FIG. 4 is a functional diagram of the motor controller of the electric vehicle propulsion system of FIG. 1.

As shown in FIGS. 3 and 4, the components of the electric vehicle propulsion system 10 are interconnected via various data busses. The data busses can be of the electrical, optical, or electro-optical type as is known in the art.

The battery charger 16 receives command signals from and sends status signals to the motor controller 18 for charging the battery 40. The battery charger 16 provides a controlled battery charging current from an external AC power source (not shown). Preferably, AC current is drawn from the external source at near-unity power factor and low harmonic distortion in compliance with expected future power quality standards. Further, the battery charger 16 is preferably designed to be compatible with standard ground fault current interrupters and single-phase power normally found at residential locations.

The oil pump unit 34 and radiator/fan 36 also receive command signals from and send status signals to the motor controller 18. Referring to FIG. 1, the electric vehicle propulsion system 10 utilizes a closed loop cooling system including the cold plate 14, the filter 30, the motor 28, the oil pump unit 34, and the radiator/fan 36. Preferably, the cold plate 14 is a hollow body having a double-sided surface on which the battery charger 16, the motor controller 18, and the power distribution module 20 are mounted in thermal contact. It is contemplated that the DC/DC converter 38 can also be mounted in thermal contact with the cold plate 14. The oil pump unit 34 circulates oil, e.g., aircraft turbine oil, from the oil reservoir of the motor 28 through the radiator/fan 36, the cold plate 14, the filter 30, and back through the motor 28 as shown in FIG. 5A. Heat is removed from the oil by the radiator/fan 36 and the oil is filtered by the filter 30, which can comprise a commercially available oil filter known in the art. Preferably, the oil pump unit 34 is controlled by the motor controller 18 to provide a variable rate of oil flow. It should be appreciated that the closed loop oil cooling system of FIG. 5A protects the electric vehicle propulsion system 10 from the harsh automotive operating environment, thus increasing reliability and reducing maintenance. Further, because the same oil used for lubricating the motor 28 is also used for cooling of the system control unit 12, the cooling system can have a simplified design.

Figure 5B:
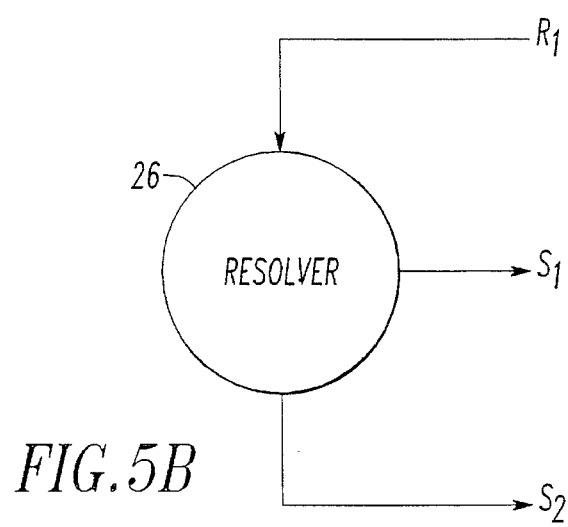
FIG. 5B is a schematic diagram of the resolver of the electric vehicle propulsion system of FIG. 1.

The resolver 26 is illustrated in FIG. 5B and is positioned proximate to the motor 28 for detecting the angular position of the motor shaft and for providing signals indicative of the angular position of the motor shaft to the motor controller 18. The reference signal line $R_1$ connected to the resolver is for a positive or negative reference value indicating the angular position of the motor shaft. The $S_1$ signal line from the resolver provides a positive or negative sine value for the angular position of the motor shaft and the $S_2$ signal line from the resolver provides a positive or negative cosine value for the angular position of the motor shaft.

The resolver 26 can comprise a commercially available resolver or other resolver known in the art. As explained in more detail below, reference signals for the resolver 26 are provided by the motor controller 18.

The chassis controller 22 and the motor controller 18 receive signals from a vehicle communication bus. Generally, the vehicle communication bus serves as a communication pathway for interfacing various vehicle sensors and controllers to the chassis controller 22 and the motor controller 18, as will be explained in more detail below.

The chassis controller 22 comprises a microprocessor-based digital and analog electronics system and provides control and status interfacing to the vehicle's sensors and controllers and to the motor controller 18. For example, the chassis controller 22 is connected, via the vehicle communication bus, to the vehicle key switch, accelerator, brake, and drive selector switches. The chassis controller 22 interprets signals from these switches to provide the motor controller 18 with start-up, drive mode (e.g., forward, reverse, and neutral), motor torque, regenerative braking, shutdown, and built-in test (BIT) commands. Preferably, the chassis controller 22 communicates with the motor controller 18 via an opto-coupled serial data interface and receives status signals from the motor controller 18 of all the commands sent to verify the communication links between the chassis controller 22, the vehicle, and the motor controller 18 and to verify that the vehicle is operating properly. It should be appreciated that because the chassis controller 22 provides the control and status interfacing to the vehicle's sensors and controllers and to the motor controller 18, the electric vehicle propulsion system 10 can be modified for use with any number of different vehicles simply by modifying the chassis controller 22 for a particular vehicle.

The chassis controller 22 also provides battery management capabilities by using signals received over the vehicle communication bus from a battery current sensor located in the power distribution module 20. The chassis controller 22 interprets signals from the battery current sensor, provides charging commands to the motor controller 18, and sends a state-of-charge value to a "fuel" gauge on the vehicle dashboard. The chassis controller 22 further connects, via the vehicle communication bus, to vehicle controllers including odometer, speedometer, lighting, diagnostic and emissions controllers, as well as to an RS-232 interface for system development.

As shown in FIG. 4, the motor controller 18 includes a low voltage power supply 42, an input filter and DC relay control unit 44, a vector control board 46, and first and second power bridges and gate drives 48 and 50, respectively.

The low voltage power supply 42 converts the 12 volt output from the DC/DC converter 38 to provide +5 V, +/-15 V, and 20 V outputs to the input filter and DC relay control unit 44, the vector control board 46, the first power bridge 48, and the second power bridge 50. The low voltage power supply 42 can comprise a commercially available power supply as is known in the art.

The input filter and DC relay control unit 44 includes electrical connections for coupling the 320 volt output of the power distribution module 20 to the first and second power bridges 48 and 50, respectively. The input filter and DC relay control unit 44 includes EMI filtering, a relay circuit for disconnecting the coupling of the 320 volt output of the power distribution module 20 to the first and second power bridges 48 and 50, respectively, and various BIT circuits including voltage sense circuits and a chassis ground fault circuit. Preferably, the input filter and DC relay control unit 44 receives control signals from and sends status signals, e.g., BIT signals, to the vector control board 46.

Figure 6:
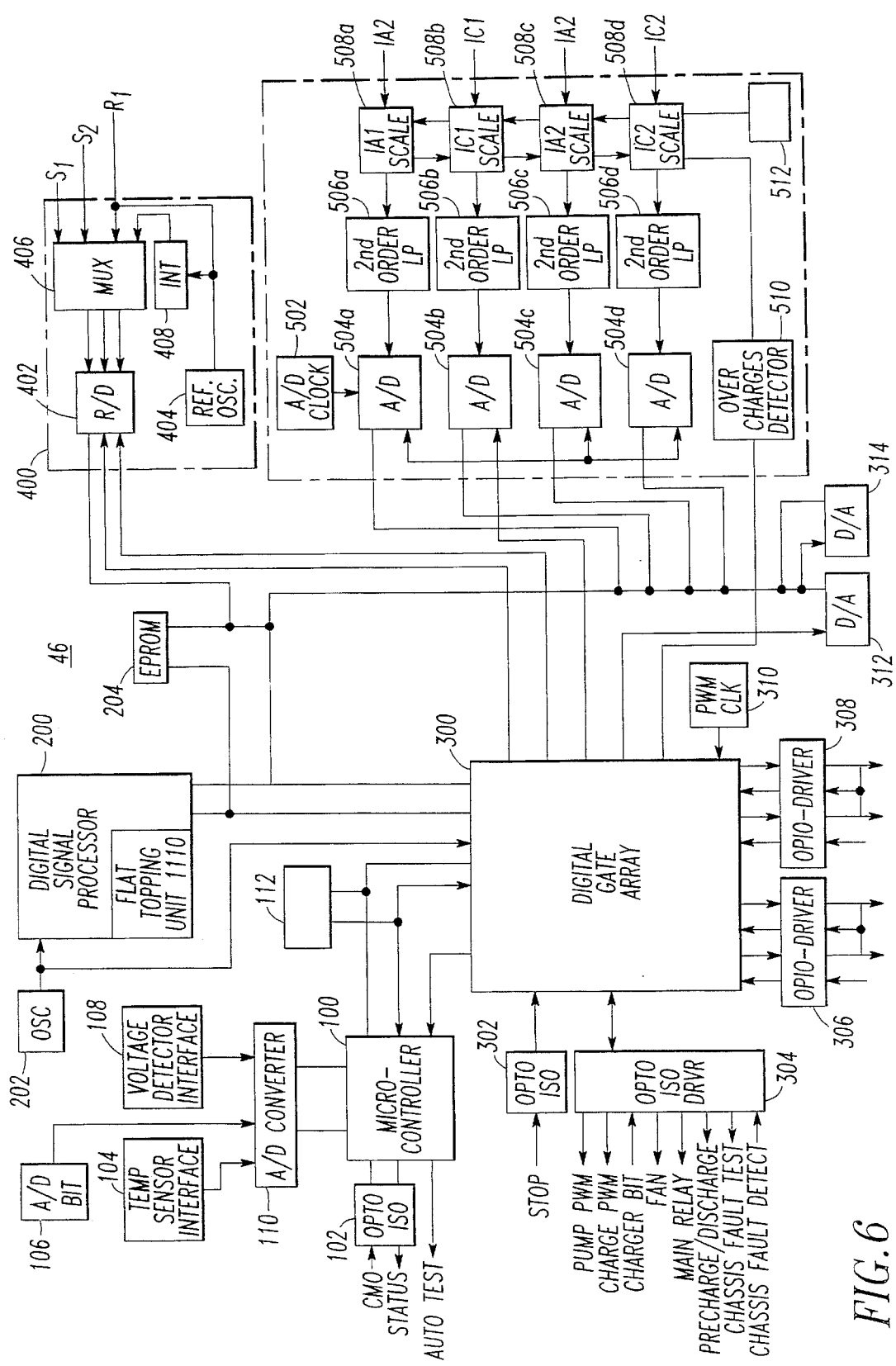
FIG. 6 is a schematic diagram of the vector control board of the motor controller of FIG. 4.

As shown in FIG. 6, the vector control board 46 comprises a microcontroller 100, a digital signal processor 200, a digital gate array 300, a resolver interface 400, and an analog interface 500. Clock signals for the microcontroller 100, the digital signal processor 200, and the digital gate array 300 are provided by an oscillator 202.

The resolver interface 400 includes an R/D converter 402, a reference oscillator 404, a multiplexor 406, and a BIT circuit 408. The resolver interface 400 receives via the multiplexor 406 rotor position measurements in the form of signals S1 and S2. The R/D converter 402 then converts the signals S1 and S2 to digital values. As explained above, the signals S1 and S2 are produced by the resolver 26 and are indicative of the angular position of the shaft of the motor 28. The resolver interface 400 also provides reference signals to the resolver 26. In particular, the reference oscillator 404 produces reference waveforms which are supplied to the resolver 26 as signal R1 via the multiplexor 406. The BIT circuit 408 performs BIT operations to test the operation of the resolver interface 400.

The analog interface 500 includes an A/D clock, a plurality of A/D converters 504a–d, a plurality of antialiasing filters 506a–d, a plurality of current scalers 508a–d, an over current detector 510, and a BIT circuit 512. The analog interface 500 receives and processes current measurements in the form of signals IA1, IC1, IA2, and IC2 from current sensors (not shown) located at the first and second power bridges 48 and 50, respectively. The current sensors are preferably coupled to the windings A1, A2, C1, and C2 of the motor 28. The signals IA1, IC1, IA2, and IC2 are received and scaled by the current scalers 508a–d, filtered by the antialiasing filters 506a–d, and then converted to digital values by the A/D converters 504a–d. The overcurrent detector 510 detects overcurrents in the current scalers 508a–d and the BIT circuit 512 performs BIT operations to test the operation of the analog interface 500.

The microcontroller 100 comprises, for example, a microcontroller selected from the Motorolla 68HC11 family of microcontrollers or other similar device known in the art. As its main function, the microcontroller 100 performs various housekeeping functions of the vector control board 46. For example, the microcontroller 100 communicates with the chassis controller 22 by receiving current commands, BIT commands, torque commands, and mode commands from and sending status signals to the chassis controller 22 via an opto-isolator 102. The microcontroller 100 also communicates with the digital signal processor 200 by providing the digital signal processor 200 with torque requests via the digital gate array 300, and communicates with the digital gate array 300 to perform, for example, various BIT and control operations. Preferably, the microcontroller 100 includes a combination of RAM, ROM, and EEPROM for storing program instructions for controlling its operation. Alternatively, some or all of the program instructions can be stored in an EPROM 112.

The microcontroller 100 also receives analog input signals from a temperature sensor interface 104, an A/D BIT circuit 106, and a voltage detector interface 108 via an A/D converter 110. The A/D converter 110 is preferably part of the microcontroller 100.

The analog input signals from the temperature sensor interface 104 include temperature signals transmitted by temperature sensors (not shown) located on the cold plate 14 in proximity to the first and second power bridges 48 and 50, respectively. The analog input signals from the A/D BIT circuit 106 include voltage test signals for testing the A/D converter 110. The analog input signals from the voltage detector interface 108 include voltage signals transmitted by voltage detectors (not shown) located in the input filter and DC relay control unit 44.

The digital signal processor 200 comprises, for example, a Texas Instrument TMS320C50 digital signal processor or other similar device known in the art. As its main function, the digital signal processor 200 implements a torque control program stored in an EPROM 204 and down loaded to RAM located in the digital signal processor 200 upon start up of the electric vehicle propulsion system 10. Alternatively, the digital signal processor 200 may be preprogrammed to include the torque control program.

In particular, the digital signal processor 200 receives the digitized rotor position measurements from the resolver interface 400, the digitized current measurements from the analog interface 500, and torque commands from the microcontroller 100 and uses these measurements and commands to generate phase voltage signals. As will be explained in more detail below, these phase voltage signals are supplied to the digital gate array 300, whereby the digital gate array 300 produces pulse width modulated (PWM) voltage waveforms in the form of gate drive signals to produce desired acceleration or braking effects in the motor 28. The phase voltage signals, and thus the PWM voltage waveforms, are generated in accordance with the torque control program which is designed to result in a requested torque output.

The digital gate array 300 comprises, for example, a field programmable gate array or other similar device known in the art. Generally, the digital gate array 300 receives the phase voltage signals Va, Vb, and Vc from the digital signal processor 200 and produces PWM voltage waveforms in the form of gate drive signals A1U, A1L, B1U, B1L, C1U, C1L and gate drive signals A2U, A2L, B2U, B2L, C2U, and C2L for driving the first and second power bridges 48 and 50, respectively. The digital gate array 300 also generates and transmits via an opto-isolator driver 304 various PWM signals (e.g., "Pump PWM" and "Chrgr PWM") for controlling the oil pump unit 34 and the battery charger 16, as well as various control signals (e.g., "Fan" "Main Relay,", "Precharge/Discharge Relay," and "Chassis Fault Test") for controlling the radiator/fan 36, main and precharge/discharge relays (not shown) located in the input filter and DC relay control unit 44, and a chassis fault detection unit also located in the input filter and DC relay control unit 44. Further, the digital gate array 300 receives BIT signals (e.g., "Chrgr BIT") and fault detect signals (e.g., "Chassis Fault Detect") via the opto-isolator driver 304, and receives operator initiated emergency stop signals (e.g., "Stop") via the opto-isolator 302.

Figure 7:
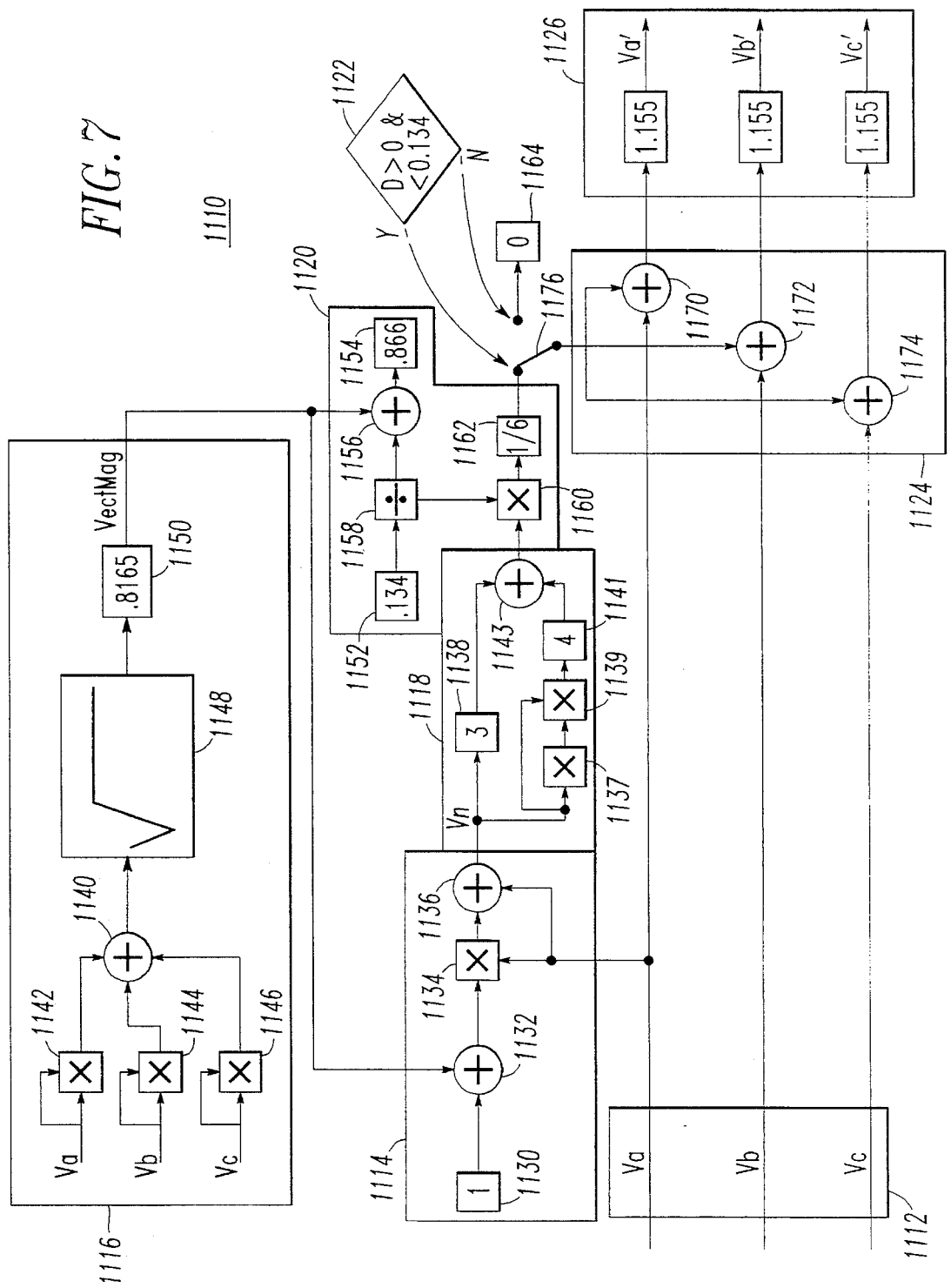
FIG. 7 is a block diagram of signal flat-topping unit in accordance with the present invention.

Before sending the phase voltage signals Va, Vb, and Vc from the digital signal processor 200 to the digital gate array 300, the phase voltage signals Va, Vb, and Vc are passed through a flat-topping circuit (shown in FIG. 7).

An exemplary embodiment of the flat-topping unit of the present invention is shown in FIG. 7, and is designated generally by the reference numeral 1110. The flat-topping unit 1110 is included in the digital signal processor 200 (FIG. 6). As shown in FIG. 7, the flat-topping unit includes an input section 1112, a normalization unit 1114, a voltage vector magnitude calculation unit 1116, a third harmonic generator unit 1118, a proportioning unit 1120, a decision unit 1122, an adder 1124, and output section 1126.

The flat-topping unit of the present invention includes means for producing first, second and third reference signals.

As embodied herein and referring to FIG. 7, an input section 1112 of the flat-topping unit receives three reference voltage signals Va, Vb and Vc. These signals correspond to the amount of voltage required to develop the torque needed to meet the operator's demand for power (the torque request may not match the actual power demanded by the operator due to system limitations such as the amount of the battery power, temperature, and current speed of the vehicle). For example, the voltage reference signals from a flux control system in the digital signal processor 200 of the vector control board 46 (FIG. 6) are applied to the input section 1112 of the flat-topping unit 1110, which is a part of the digital signal processor 200.

Also, voltage reference signals, such as disclosed in U.S. Pat. No. 5,168,204 ('204) and U.S. Pat. No. 5,182,508 ('508) both to Schauder, may be used for the flat-topping unit 1110 of the present invention. However, if the (analog) voltage reference signals from the '204 and '508 patents are used, for example, they must be converted to digital signals before being applied to the flat-topping unit 1110 of the present invention.

The flat-topping unit of the present invention includes a normalizing unit for normalizing the first reference signal.

As embodied herein and referring to FIG. 7, the normalizing unit 1114 receives one of the voltage references signals, Va, for example, and normalizes the signal to unity. The normalizing unit 1114 includes a subtracter 1132 for subtracting the vector value of the signal from the voltage vector magnitude calculation unit 1116 (the vector value will be discussed in detail later) from one (1−VectMag). The difference is multiplied by the Va signal itself by a multiplier 1134. This product is added to the Va signal itself again by an adder 1136 to produce a normalized signal.

For normalization, the signal Va needs to be divided by the vector value. The normalizing unit 1114, however, approximates this division linearly, to avoid computing a division operation. This approximation works very well for values of Va greater than 0.866, with a less than 2% error. The flat-topping unit of the present invention does not need to perform normalization for signal values less than 0.866.

The flat-topping unit of the present invention includes means for generating a third harmonic waveform of the normalized first reference signal.

As embodied herein and referring to FIG. 7, a third harmonic waveform generating unit 1118 is included in the flat-topping unit 1110. The unit 1118 uses a trigonometric identity to generate a third harmonic waveform, sin(3x). In particular, the unit 1118 applies the following trigonometric identity:

$$\sin(3x) = 3\sin(x) - 4\sin^3(x) \qquad (1)$$

The third harmonic waveform generating unit 1118 receives one of the voltage reference signals, Va, for example, which has been normalized and this normalized signal (Vn) replaces sin(x) in the above identity to generate the sin(3x) third harmonic waveform. The normalized signal, Vn, is multiplied by three (3) (shown by label 1138) to produce the first term of the identity, 3Vn. The cube of the normalized signal, $Vn^3$ is developed by multipliers 1137 and 1139, as shown in FIG. 7. The cubed signal ($Vn^3$) is multiplied by four (4) (shown by label 1141) to produce the second term of the identity, $4Vn^3$ The second term, $4Vn^3$, is subtracted from the first term, 3Vn, by a subtracter 1143 to produce the third harmonic waveform, $(3Vn - Vn^3)$.

The flat-topping unit of the present invention includes means for comparing a vector value produced according to the first, second and third reference signals to a predetermined threshold value, the predetermined threshold value being the largest realizable pure signal value.

As embodied herein and referring to FIG. 7, the voltage vector magnitude calculation unit 1116 predicts the magnitude by computing the square root of the sum of the squares of Va, Vb and Vc and multiplying by 0.8165. In particular, the unit 1116 includes multipliers 1142, 1144 and 1146 for multiplying each of the reference signals, Va, Vb and Vc by itself, respectively, to produce the square of each signal. An adder 1140 produces a sum of the three squared signals and a square root unit 1148 produces a square root signal of the sum of the squared signals. The square rooted signal is then multiplied by a value 0.8165 (which is a normalizing value shown by label 1150) to produce a predicted magnitude of the reference signal (VectMag).

The normalizing factor 0.8165 allows the VectMag value to be in the range of −1 to +1, where −1 to +1 are represented in negative full scale to positive full scale. For example, a three phase system, as in the flat-topping unit of the present invention, uses three signals, Va, Vb and Vc, where $$Va = (Va_{peak}) \sin x$$

$$Vb = (Vb_{peak}) \sin (x + 120°)$$

$$Vc = (Vc_{peak}) \sin (x + 240°)$$

Since each $Va_{peak}$, $Vb_{peak}$, and $Vc_{peak}$ varies from −1 to +1, Va, Vb and Vc also vary from −1 and +1. If $Va_{peak} = Vb_{peak} = Vc_{peak} = 1$, then VectMag will be at its maximum (of course, Va, Vb, and Vc will not have a magnitude of "1" simultaneously because of the phase differences 120° and 240°). For all angles x, the peak magnitude (at 1148 in FIG. 7) of Va, Vb and Vc will be, $$mag_{pk} = \{(1\sin x)^2 + [1\sin (x+120°)]^2 [1\sin (x+240°)]^2\}^{1/2}$$

For all x, $mag_{pk}$ is equal to 1.2247. Now, the peak magnitude from 1148 is normalized to its maximum value by multiplying the peak magnitude by (1/1.2247=0.8165) to obtain VectMag. During normal operation of the flat-topping unit, all vector values from the square root 1148 are multiplied by 0.8165 and, accordingly, VectMag varies in the range of −1 to +1.

Figure 7A:
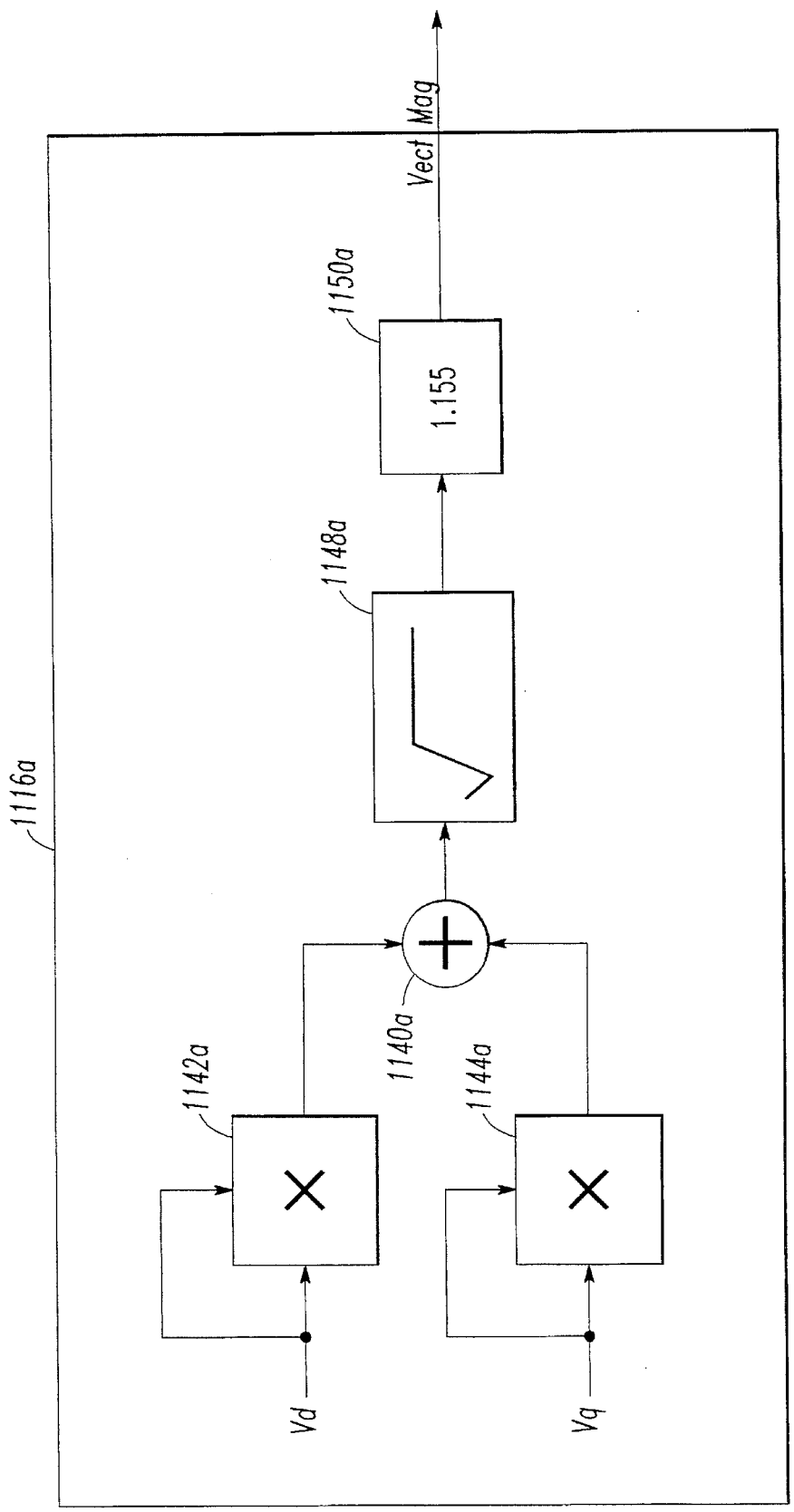
FIG. 7A is a block diagram of another embodiment of the voltage vector magnitude calculation unit of the signal flat-topping unit in FIG. 7.

Another (second) embodiment of the vector magnitude calculation unit of the flat-topping unit is shown in FIG. 7A. The vector magnitude calculation unit 1116a of this embodiment uses a three phase system with vector control. For this embodiment, a coordinate system transformation is required. In particular, the vector magnitude calculation unit 1116 (first embodiment) of FIG. 7 uses signals Va, Vb and Vc which are signals in a stationary frame, whereas the second embodiment in FIG. 7A uses signals in a rotating frame. Accordingly, a stationary-to-rotating frame transformation is required for the second embodiment.

A Vdq transformation converts Va and Vc to a direct component Vd and quadrature component Vq, which represent Cartesian coordinates of a stator current demand vector signal in a synchronously rotating reference frame (see U.S. Pat. No. 5,168,204 to Schauder for a detailed explanation). The transformation equation is as follows, $$Vd = -Va \sin (y-60°) - Vc \sin y$$

$$Vq = -Va \cos (y-60°) - Vc \cos y$$

where y is the rotor position. Regardless of the embodiment used, the resultant VectMag signal from the vector magnitude calculation unit (either 1116 or 1116a) will be the same.

Referring to FIG. 7A, the vector magnitude calculation unit 1116a includes multipliers 1142a and 1144a, which produce squares of Vd and Vq, respectively, and an adder 1140a. The adder 1140a produces a sum of the squares of Vd and Vq. The sum from the adder 1140a is square rooted (1148a) and multiplied by a normalizing value of 1.155 (1150a) to produce the vector magnitude, VectMag.

The normalizing value 1.155 is similar to the normalizing value 0.8165 of the first embodiment in FIG. 7. To obtain the normalizing value 1.155 of the second embodiment, the maximum value of the magnitude is determined using Vd and Vq. If the rotor position is y=0° and $Va_{peak} = Vc_{peak} = 1$ (which is the same peak value used in the first embodiment), then Va=0 and Vc=−0.866 (as in the first embodiment) and Vd and Vq are obtained using the transformation equations from above, $$Vd = 0$$

$$Vq = 0.866$$

The maximum magnitude will be $(Vd^2 + Vq^2)^{1/2} = 0.866$ and this maximum magnitude will be the same of all angles of y. Accordingly, for the VectMag of the second embodiment to be equal to the VectMag from the first embodiment, the magnitude value from the square root (1148a) must be normalized by multiplying the magnitude value by (1/0.866)=1.155.

It is preferable to use the second embodiment for a three phase system with vector control because Vd and Vq signals will have been generated for the vector control system. Nevertheless, both embodiments can use the Va, Vb and Vc signals of the stationary frame to obtain the VectMag.

Referring to FIG. 7, the vector magnitude, VectMag, from the voltage vector magnitude calculating unit 1116 or 1116a is sent to a proportioning unit 1120 which determines, from the VectMag, a proportional amount of the third harmonic to add to each of the voltage reference signals, Va, Vb and Vc. The proportional amount of the third harmonic to be added corresponds to the difference between the VectMag and 0.866 (VectMag−0.866). The value 0.866 is the largest pure signal realizable. The proportioning unit 1120 shows the difference operation using a subtracter 1156 which subtracts 0.866 (labeled as 1154) from VectMag. If the difference is a negative value, i.e., VectMag is less than 0.866, then the proportioning unit is bypassed and a value of zero is used, as will be explained later.

It is known that the optimum proportion of the third harmonic resulting in the flattest top is one sixth (⅙) the fundamental amplitude (see the Related Art section above). Accordingly, the difference (VectMag−0.866) is scaled using the proportioning unit 1120 such that a proportional amount in the range from zero to one sixth (0.167) of the fundamental amplitude is added to the voltage reference signals. In particular, the difference value (VectMag−0.866) is divided by 0.134 (1−0.866) by a divider unit 1158 (this produces a value that is between 0 and 1 which is proportional to values between 0.866 and 1). The signal from the divider unit 1158 is used to linearly scale the amount of the harmonic content calculated based on the trigonometric identity (1).

The quotient from the divider unit 1158 is multiplied by the third harmonic waveform generated from the third harmonic waveform generator unit 1118 by a multiplying unit 1160. The product of this multiplication is further multiplied by one sixth (⅙) by another multiplying unit 1162 (the value ⅙ is from the optimum proportion of the 3rd harmonic resulting in the flattest top). The final result of the proportioning unit 1120, including the correctly proportioned amount of the third harmonic to be added to the voltages references Va, Vb and Vc, is transferred to a switch 1176.

The flat-topping unit of the present invention includes means, responsive to the comparing means, for adding to each of the first, second and third reference signals a value of zero, when the vector value is less than or equal to the predetermined threshold value, or a proportional amount of the third harmonic signal, when the vector value is greater than the predetermined threshold value.

As embodied herein and referring to FIG. 7, the decision unit 1122 receives the vector value calculated from the voltage vector magnitude calculation unit 1116 and determines whether the vector value is greater than 0.866, which is the amplitude of the largest pure signal realizable. If the vector value is greater than 0.866, then a proportional amount of the third harmonic in the range from zero to ⅙ (0.167) of the fundamental amplitude is added by an adding unit 1124 (which includes adders 1170, 1172 and 1174, respectively) to the fundamental waveform of each of the first, second and third reference signals (Va, Vb and Vc). If the vector value is less than or equal to 0.866, then a value of zero is added to the first, second and third reference signals. In particular, FIG. 7 shows a switch 1176 which connects to either the proportioning unit 1120 or the zero value unit 1164, depending on the decision unit 1122.

The results of the adders 1170, 1172 and 1174 are multiplied by a normalizing value (1/0.866)=1.155 in the output section 1126 and output as signals Va', Vb' and Vc' having an extended line-to-line voltage range. Multiplying the results from the adders 1170, 1172 and 1174 by 1.155 normalizes the output to one, since 0.866 is the largest pure signal realizable.

Figure 11:
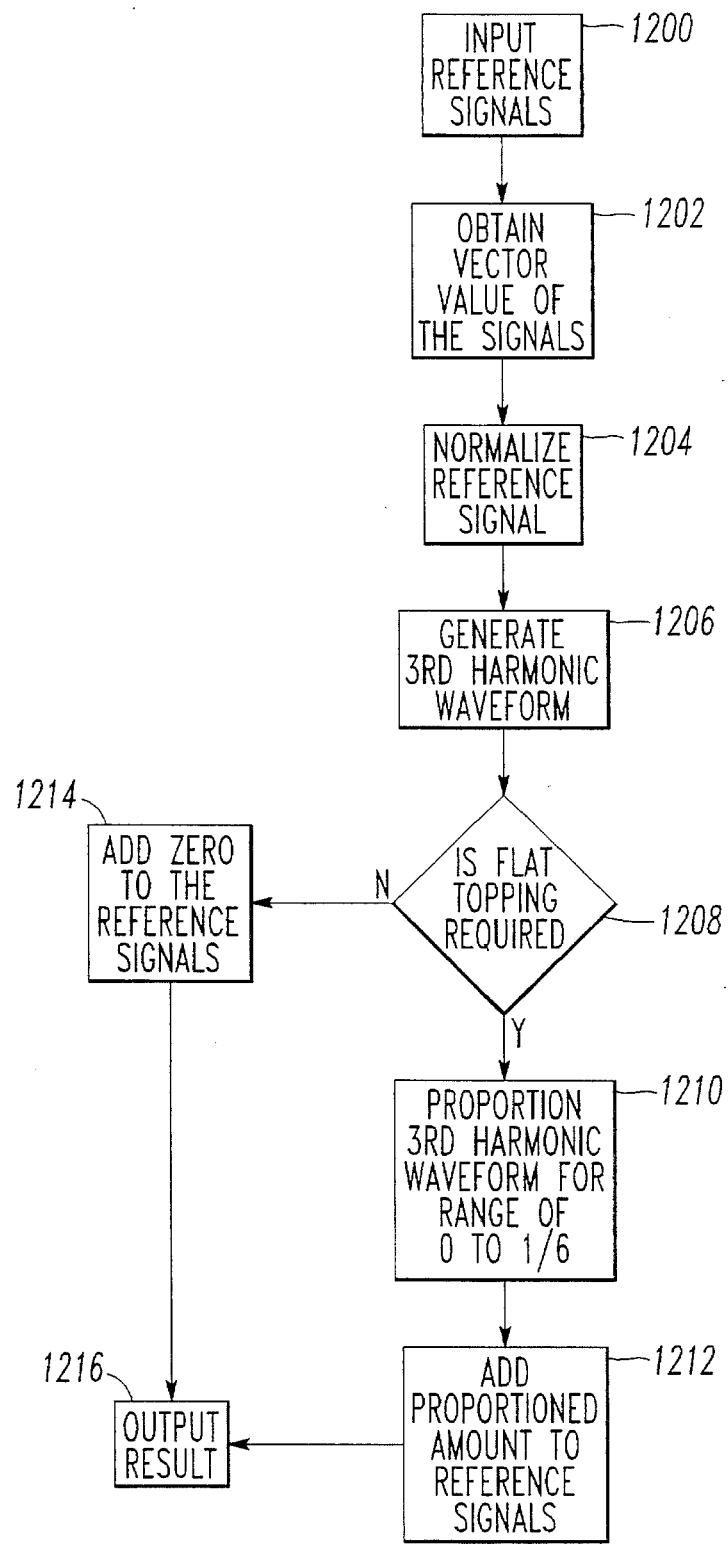
FIG. 11 is a flowchart of an operation of the signal flat topping unit in FIG. 7.

Now the operation of the flat-topping unit of the present invention will be explained with reference to FIGS. 7 and 11.

The voltage reference signals Va, Vb and Vc are input to the flat-topping unit (step 1200). Using the trigonometric identity (1), a third harmonic waveform is generated from one of the voltage reference signals, Va, for example. Before Va can be used, however, it is normalized to unity (step 1204). To accomplish this normalization, Va is input to the multiplier 1134 of the normalizing unit 1114. The multiplier 1134 outputs a product of Va and a difference between one and vector value of the Va (1−VectMag). The difference is determined by a subtracter 1132 which subtracts the vector value obtained from the voltage vector magnitude calculation unit 1116 or 1116a from one.

The voltage vector magnitude calculation unit 1116 or 1116a predicts the vector value (VectMag) (step 1202). This operation is shown in the voltage vector magnitude calculation unit 1116 or 1116a in FIGS. 7 and 7A, respectively. The vector value output from the voltage vector magnitude calculation unit 1116 or 1116a is applied to the subtracter 1132 of the normalizing unit 1114 and the proportioning unit 1120.

The proportioning unit 1120 determines a proportional amount of the third harmonic waveform to be added to each of the voltage reference signals Va, Vb and Vc, according to the vector value. Before calculating the proportional amount, however, the flat-topping unit 1110 determines whether flat-topping should be performed at all based on the vector value from the voltage vector magnitude calculation unit 1114 (step 1208). The decision unit 1122 determines whether the vector value (VectMag) is greater than 0.866, which is the largest pure signal realizable. The decision unit performs this comparison by determining whether the difference value (D=VectMag−0.866) is greater than zero and less than 0.134 (obtained from 1−0.866). If VectMag is less than or equal to 0.866 (i.e., greater than 0.134), flat-topping is not required (step 1214). If VectMag is greater than 0.866 (i.e., less than 0.134), however, a proportional amount of the third harmonic waveform (step 1210) corresponding to (VectMag−0.866) is added to the voltage reference signals Va, Vb and Vc (step 1212). Although step 1210 is shown to be performed after step 1208, step 1210 may be performed before step 1208.

The proportional amount is determined by the proportioning unit 1120. The unit 1120 first determines the difference between the vector value (VectMag) and 0.866 (VectMag−0.866). The result of this difference (VectMag−0.866) is scaled from dividing the result by 0.134 (1−0.866) by a divider 1158. The quotient from the divider unit 1158 is multiplied by the third harmonic waveform generated from the third harmonic waveform generator unit 1118 by a multiplying unit 1160. The product of this multiplication is further multiplied by one sixth (⅙) by another multiplying unit 1162. Accordingly, a proportional amount in the range from zero to one sixth (0.167) of the third harmonic is determined according to the vector value. One sixth is chosen because this value allows the optimum flat-topping result.

The sums from the adder unit 1124 are multiplied by a normalization constant 1.155 (discussed above) and output as Va', Vb' and Vc' (step 1216), as shown in FIG. 7.

The scaling affect allows the addition of a linearly increasing amount of the third harmonic waveform, from 0% for voltage vector magnitudes of less than or equal to 0.866 to 16.7% (⅙) for voltage vector magnitudes of 1. Voltage vector magnitudes of greater than one are not allowed. This proportional addition results in a smooth transition between flat-topping and non-flat-topping wave regions. Of course, other triplen harmonics may be added to the fundamental waveform of the reference signals but the gain from the other triplen harmonics would not add significantly to the desired result from using only the third harmonic.

Figure 8:
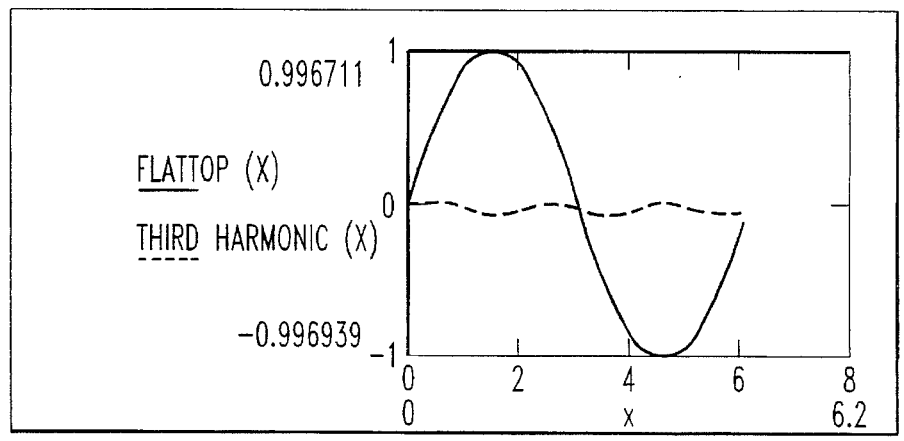
FIG. 8 is a graph of a simulated output illustrating the operation of signal flat-topping unit of the present invention.
Figure 9:
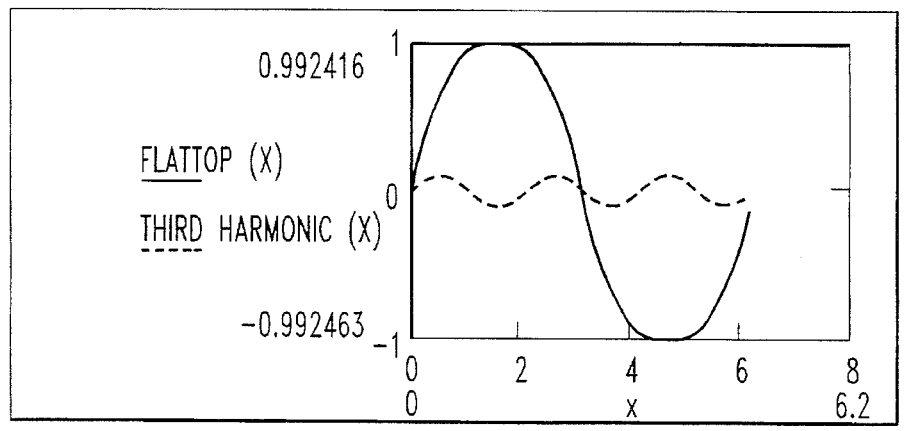
FIG. 9 is another graph of a simulated output illustrating the operation of signal flat-topping unit of the present invention.
Figure 10:
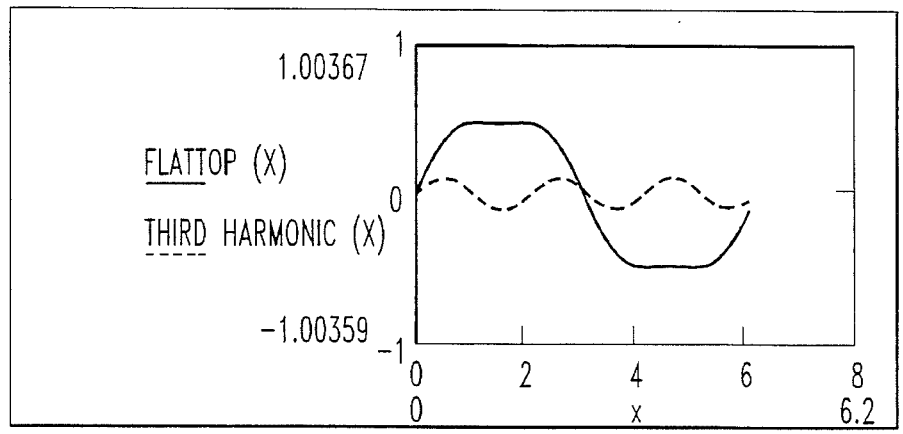
FIG. 10 is another graph of a simulated output illustrating the operation of signal flat-topping unit of the present invention.

Simulations illustrating the operation of the flat-topping unit of the present invention are shown in FIGS. 8, 9 and 10.

FIGS. 8, 9 and 10 show the third harmonic and resultant Va', Vb' and Vc' waveforms for sample sinewave amplitudes of 0.9, 0.95 and 1.0, respectively. As shown in FIGS. 8, 9 and 10, the flat-topping phenomenon is more exaggerated as the sinewave amplitude approaches 1.0.

Accordingly, in the present invention, a harmonic distortion is used with precision applying a special trigonometric identity to optimize the amount of flat-topping for all three phases of the voltage references signals. The flat-topped voltage reference signals are sent to the pulse width modulator to provide appropriate three phase signals to the inverter unit. The inverter unit provides the necessary power corresponding to the voltage reference signals from the pulse width modulator to the motor unit.

It will be apparent to those skilled in the art that various modifications and variations can be made in the flat-topping unit of the present invention without departing from the spirit or scope of the invention. Thus it is intended that the present invention cover the modifications and variations of this invention provided they come within the scope of the appended claims and their equivalents.

I claim:

1. A waveform flat-topping unit comprising:
   means for producing first, second and third reference signals;
   a normalizing unit for normalizing the first reference signal;
   means for generating a third harmonic waveform of the normalized first reference signal;
   means for producing a vector value according to the first, second and third reference signals;
   means for comparing the vector value to a predetermined threshold value;
   means, responsive to the comparing means, for adding zero to each of the first, second and third reference signals when the vector value is less than or equal to the predetermined threshold value; and
   means, responsive to the comparing means, for adding the third harmonic waveform to each of the first, second and third reference signals when the vector value is greater than the predetermined threshold value.

2. The unit according to claim 1, wherein the means for generating the third harmonic waveform generates the third harmonic waveform using the following equation:

$$Sin(3x)=3Sin(x)-4Sin3(x)$$

where $Sin(x)$=the first reference signal.

3. The unit according to claim 1, wherein the means for adding the third harmonic waveform adds a proportional amount of the third harmonic waveform to each of the first, second and third reference signals.

4. The unit according to claim 3, wherein the proportional amount of the third harmonic wafveform to be added is approximately in the range of 0% to 16.7% of the third harmonic waveform.

5. The unit according to claim 1, wherein the vector value is obtained by calculating a square root of a sum of squares of the first, second and third reference signals and multiplying the square root by a normalizing value, the normalizing value being obtained from peak values of the first, second and third reference signals.

6. The unit according to claim 5, wherein the normalizing value is 0.8165.

7. The unit according to claim 1, wherein the predetermined threshold value is approximately 0.866 volts.

8. The unit according to claim 1, wherein the normalizing unit comprises:
   means for subtracting the vector value from 1 and outputting a difference;
   means for multiplying the difference by the first reference signal and outputting a product; and
   means for adding the product to the first reference signal.

9. The unit according to claim 1, wherein the first, second and third reference signals are from a stationary frame.

10. A waveform flat-topping unit comprising:
    means for producing first, second and third reference signals of a stationary frame;
    means for producing fourth and fifth reference signals of a rotating frame, where both the fourth and fifth reference signals correspond to a difference between the first and third reference signals;
    a normalizing unit for normalizing the first reference signal;
    means for generating a third harmonic waveform of the normalized first reference signal;
    means for producing a vector value according to the fourth and fifth reference signals;
    means for comparing the vector value to a predetermined threshold value;
    means, responsive to the comparing means, for adding zero to each of the first, second and third reference signals when the vector value is less than or equal to the predetermined threshold value; and
    means, responsive to the comparing means, for adding the third harmonic waveform to each of the first, second and third reference signals when the vector value is greater than the predetermined threshold value.

11. The unit according to claim 10, wherein the means for generating the third harmonic waveform generates the third harmonic waveform using the following equation:

$$Sin(3x)=3Sin(x)-4Sin3(x)$$

where $Sin(x)$=the first reference signal.

12. The unit according to claim 10, wherein the means for adding the third harmonic waveform adds a proportional amount of the third harmonic waveform to each of the first, second and third reference signals.

13. The unit according to claim 12, wherein the proportional amount of the third harmonic waveform to be added is approximately in the range of 0% to 16.7% of the third harmonic waveform.

14. The unit according to claim 10, wherein the vector value is obtained by calculating a square root of a sum of squares of the fourth and fifth reference signals and multiplying the square root by a normalizing value, the normalizing value being obtained from peak values of the first and third reference signals.

15. The unit according to claim 14, wherein the normalizing value is 0.866.

16. The unit according to claim 10, wherein the predetermined threshold value is approximately 0.866 volts.

17. The unit according to claim 10, wherein the normalizing unit comprises:
    means for subtracting the vector value from 1 and outputting a difference;
    means for multiplying the difference by the first reference signal and outputting a product; and
    means for adding the product to the first reference signal.

\* \* \* \* \*